United States Patent [19]
Clendinning et al.

[11] 3,929,937
[45] Dec. 30, 1975

[54] BIODEGRADABLE SHAPED ARTICLES FROM A MATERIAL COMPRISING A PARTICULATE ADDITION POLYMER IN A MATRIX OF A THERMOPLASTIC OXYALKANOYL POLYMER

[75] Inventors: Robert A. Clendinning, New Providence; James E. Potts, Millington; William F. Gorham, Berkeley Heights, all of N.J.

[73] Assignee: Union Carbide Corporation, New York, N.Y.

[22] Filed: Sept. 6, 1974

[21] Appl. No.: 503,687

Related U.S. Application Data

[63] Continuation-in-part of Ser. No. 275,976.

[52] U.S. Cl. .......................... 260/896; 47/9; 47/37; 260/897 R; 260/897 B; 260/888; 260/901
[51] Int. Cl.$^2$ .................. C08L 23/00; C08L 25/04; C08L 67/04
[58] Field of Search ......... 260/DIG. 43, 896, 897 R, 260/897 B, 888, 901, 78.3 R; 47/9, 37

[56] References Cited
UNITED STATES PATENTS

| | | | |
|---|---|---|---|
| 3,534,120 | 10/1970 | Ando et al. | 260/78.3 |
| 3,592,877 | 7/1971 | Mullins | 260/897 |
| 3,632,687 | 1/1972 | Walter et al. | 260/78.3 |
| 3,636,956 | 1/1972 | Schneider | 260/78.3 |
| 3,734,979 | 5/1973 | Koleske et al. | 260/897 |

*Primary Examiner*—Eugene C. Rzucidlo
*Attorney, Agent, or Firm*—James J. O'Connell

[57] ABSTRACT

Shaped articles fabricated from material comprising particulate addition polymer, e.g., polyethylene, in a matrix of biodegradable thermoplastic oxyalkanoyl polymer, e.g., epsilon-caprolactone homopolymer. Such articles are useful as mulch film, transplanter containers, package containers, and the like.

19 Claims, No Drawings to # BIODEGRADABLE SHAPED ARTICLES FROM A MATERIAL COMPRISING A PARTICULATE ADDITION POLYMER IN A MATRIX OF A THERMOPLASTIC OXYALKANOYL POLYMER

CROSS-REFERENCE TO RELATED APPLICATION

This is a continuation-in-part of application Ser. No. 275,976 filed July 28, 1972, now abandoned.

This invention relates to improved biodegradable shaped articles having utility as mulch films, transplanter containers, disposable containers, shipping crates and boxes, and the like.

Agricultural mulches are used to cover the soil about crops or other plantings in order to prevent or retard weed growth and to increase soil water retention and temperature. For many years, various naturally occurring materials have been used for this purpose such as peat moss, wood chips, chopped bark, sawdust, etc. However, repeated rainfalls tend to wash away such natural mulches leaving void and barren areas in the field. More recently, polyethylene film, both in its transparent state and its opaque state, has been found to be a useful mulch. When its presence on the ground is no longer desired, the film is physically removed from the fields. The necessity of such removal increases costs and complicates post harvest field preparation. Currently, the film is collected and burned. Obviously, it would be more desirable if the use of synthetic mulches more closely conformed to the practice with natural mulches. These natural mulches are not removed from the ground, but rather are turned back into the soil upon plowing at the start of the next growing season.

In the seed and nursery industries, it is the practice of the horticulturist to plant seeds or seedlings in soil or conditioned material which is contained in relatively small containers, such as metal cans or clay pots, so that initial growth may be carefully controlled under greenhouse or other desirable conditions. During such growth, the root system of the plant develops and becomes established within the soil or other material in the container. The use of metal, clay or other similar types of containers is generally satisfactory during the initial growth period. A major drawback of such containers is that the plant must be entirely removed from the container when it is to be transplanted to the field or to a larger container. Since the root system has developed within the soil or material in which growth was started, the roots are firmly embedded and intertwined with such soil and removal from the container of the plant and the soil in which the roots are established disturbs the root system and results in damage thereto. It would be advantageous, therefore, if such containers were fabricated from materials comprising biodegradable substances in which the container possessed the capability of maintaining its shape during the initial growth period of a plant and, after transplanting the container and its contents to the field, it possessed the capability of biodegrading and disintegrating.

In the regeneration of forests it is the practice of the silviculturist to employ, for the most part, bare-root planting methods. Though it is estimated that well over one billion bare-root tree seedlings are planted annually in North America, the bare-root planting method is fraught with disadvantages. A formidable obstacle to the silviculturist is the rapidity of physical deterioration of the bare-root stock. Reforestation is also beset with labor problems, antiquated tools, and dated concepts of planting. The silviculturist has very recently turned to experimenting with container planting methods. In this regard, new shapes and types of containers and accessory equipment for growing and planting seedlings have been devised. One method involves the mechanical metering of containerized seedlings into the terrain. The equipment utilized is a "planting gun" in which the container, in the shape of a "bullet", is placed into the planting gun, passed through the gun muzzle, and then mechanically inserted into the ground. The bullet can be fabricated from material such as polystyrene and is quite rigid in construction. To permit root egress of the seedling from such bullet to the surrounding soil after planting, the walls of the bullet can be weakened by strategically located grooves, splits, and/or holes. Unfortunately, there are drawbacks to the transplanter container method briefly described above. The plastic container or bullet is not biodegradable, that is, it is not consumed or substantially consumed by the action of microorganisms such as fungi and bacteria. Not only does this non-biodegradability factor represent an ecological problem, but also interference of the root system by the container wall results in damage and stunted growth of the seedling.

The literal inundation of our lands in recent years with plastic and plastic-like packaging material and shipping containers in the form of discarded film, boxes, crates, wrappings, etc., has received wide attention during the last decade. One approach towards a partial solution to this litter and disposal problem has been the incorporation of various additives into plastics to make them photodegradable. This approach, though of limited applicability, has merit and will probably gain, in the coming years, support from citizen-minded and nature-loving groups. Other approaches and alternatives, obviously, are being investigated.

It has now been discovered quite unexpectedly, indeed, that improved shaped articles can be fabricated from mixtures comprising particulate addition polymer, e.g., polyethylene in a matrix or "continuous phase" of biodegradable thermoplastic oxyalkanoyl polymer, e.g., epsilon-caprolactone homopolymer. These novel shaped articles, in the form of film, containers, bags, etc., exhibit markedly enhanced biodegradability as compared with shaped articles fabricated from a melt of the aforesaid polymers. Strictly speaking, it should be noted that biodegradable materials are those which, because of their chemical structure, are susceptible to being assimilated by microorganisms such as molds, fungi, and bacteria, when buried in the ground or otherwise contacted with the organisms under conditions conducive to their growth. The term "biodegradable" is often used indiscriminately to refer to various types of environmental degradation, including photodegradation. Though a polymeric material may be degraded by sunlight and oxygen this does not necessarily mean that such material will also be assimilated by microorganisms. The term "biodegradable", as used herein, is reserved for that type of degradability which is brought about by living organisms, usually microorganisms.

In practicing the novel process it is necessary to use a normally-solid addition polymer, in particulate form, whose softening temperature exceeds the melting point (or range) of the biodegradable thermoplastic oxyalkanoyl polymer by at least about 15°C., and desirably by at least about 25°C. For example, a suitable pair of polymers is epsilon-caprolactone homopolymer having a reduced viscosity value of 0.7 and high density polyethylene. The former, a biodegradable thermoplastic oxyalkanoyl polymer, has a melting point of about 60°C whereas the latter, a normally-solid addition polymer, has a softening temperature of about 120°C. A pair of polymers which is not particularly suitable in the practice of the invention is polyvinyl chloride (softening temperature, 100°C.) and epsilon-caprolactone homopolymer (Tm = 60°C.) since a mixture of these two polymers tends to form a solid solution during fabrication and/or on standing.

As used herein, the softening temperature (°C) is determined by measuring the secant modulus as a function of temperature of the addition polymer over a temperature range. The softening temperature is that temperature at which the secant modulus drops below 1000 psi.

The normally-solid addition polymers which are suitable in the practice of the invention include those prepared via the so-called vinyl polymerization of one or more ethylenically unsaturated monomers, e.g., ethylene, propylene, 1-butene, 2-butene, 4-methylpentene-1, the octylenes, styrene, methylstyrene, vinyl acetate, fumaric acid, methyl acrylate, ethyl acrylate, butyl acrylate, methyl methacrylate, ethyl methacrylate, butyl methacrylate, and the like. The addition polymers thus include, for example, the various normally-solid alkene homopolymers and copolymers such as the high and low density polyethylenes, the polypropylenes, and polybutylenes, the polystyrenes, ethylene/propylene copolymer, the poly(alkyl 2-alkenoates), the alkene/alkyl 2-alkenoate copolymers, mixtures thereof, and the like.

By way of illustrations, various physical properties, including the softening temperature, of commercially available normally-solid addition polymers which are suitable in the practice of the invention are listed below.

| Plastic | Density | Softening Temp. °C. |
|---|---|---|
| Low Density Polyethylene | 0.914 | 90°–100° |
| High Density Polyethylene | 0.96 | 120° |
| Polypropylene (isotactic) | 0.90 | 160° |
| Polystyrene (amorphous) | 1.05 | 100° |
| Impact Polystyrene | 1.03 | 103° |
| Poly(Methyl Methacrylate) | 1.20 | 100° |
| Acrylonitrile/Butadiene/Styrene Polymer | 1.02 | 105° |

The thermoplastic oxyalkanoyl polymers which are suitable in the practice of the invention possess a reduced viscosity value of at least about 0.1 and upwards to about 12, and higher. In various desirable embodiments thermoplastic oxyalkanoyl polymers which have a wide span of usefulness are those which possess a reduced viscosity value in the range of from about 0.2 to about 8. In the fabrication of transplanter containers having high utility in, for example, silvicultural and agricultural applications, the preferred thermoplastic oxyalkanoyl polymers possess a reduced viscosity value in the range of from about 0.25 to about 3. These polymers are further characterized in that they contain at least about 10 weight percent, desirably greater than about 20 weight percent of the oxyalkanoyl unit,

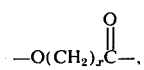

recurring therein, wherein $x$ is an integer having a value of 2 and 4–7, preferably 5. In the practice of highly suitable embodiments of the invention, the thermoplastic oxyalkanoyl polymers contain at least about 60 weight percent, and preferably at least about 80 weight percent, and upwards to about 100 weight percent of the oxycaproyl unit, i.e.,

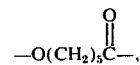

recurring therein.

The aforesaid recurring unit is interconnected through the oxy group (—O—) of one unit with a carbonyl group

of a second unit. In other words, the interconnection of such units does not involve the direct bonding of two carbonyl groups,

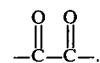

When the thermoplastic oxyalkanoyl polymer is a homopolymer or essentially a homopolymer, the polymer chain thereof consists essentially of interconnected recurring oxyalkanoyl units. In addition to the recurring oxyalkanoyl unit, the thermoplastic oxyalkanoyl polymer may comprise other moieties or groups therein especially those which intersperse or terminate the polymeric chain thereof as illustrated by the oxyalkylene group,

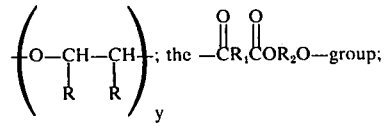

the —O—(R$_2$O)$_{\overline{n}}$ group;

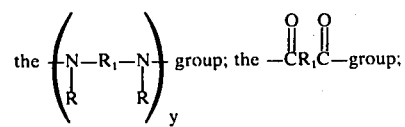

the urethane group,

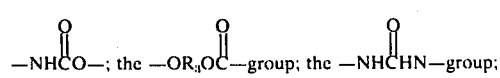

the biuret group,

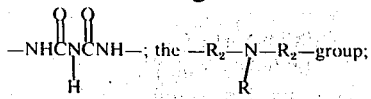 the $-R_2-N-R_2-$ group;
                                                          |
                                                          R the divalent mono- and polyaromatic rings including fused and bridged rings; lower alkyl substituted oxyalkanoyl groups; catalyst residue; the carbonate group,

and others. With reference to the aforesaid groups or moieties, the variables R, $R_1$, $R_2$, $R_3$, and $y$ can be illustrated as follows: R represents hydrogen or lower alkyl; $R_1$ represents a divalent hydrocarbon group; $R_2$ represents a divalent aliphatic hydrocarbon group or a divalent aliphatic oxa-hydrocarbon group; $R_3$ represents a divalent aliphatic hydrocarbon group; and $y$ represents an integer which has a value of at least one.

The term "lower alkyl", as used herein, represents a monovalent aliphatic hydrocarbon group having 1 to 4 carbon atoms, e.g., methyl, ethyl, propyl, isopropyl, n-butyl, etc. The term "divalent hydrocarbon group", as used herein, includes radicals such as $C_1-C_{12}$alkylene, $C_2-C_{12}$alkylidene, and $C_6-C_{12}$arylene, e.g., methylene, propylene, butylene, hexamethylene, heptamethylene, cyclohexylene, phenylene, naphthylene, propylidene, butylidene, etc. The term "divalent aliphatic hydrocarbon group", as used herein, includes $C_2-C_{12}$alkylene and $C_2-C_{12}$alkylidene. The term "divalent aliphatic oxa-hydrocarbon group", as used herein, can be represented by the empirical formula, $-C_2-C_{12}$alkylene(oxy$C_2-C_{12}$alkylene$)_{\overline{y}}$. The variable $y$, as used herein, represents an integer having a value of at least one.

As previously noted, the thermoplastic oxycaproyl polymers which are suitable in the practice of the invention are expressed in terms of their reduced viscosity values. As is well known in the art, reduced viscosity value is a measure or indication of the molecular weight of polymers. The expression "reduced viscosity" is a value obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 gram of polymer in 100 milliliters of benzene (benzene is preferred although cyclohexanone, chloroform, toluene or other common organic solvent for the polymer may be used) at 30°C.

The thermoplastic oxyalkanoyl polymers can be prepared by various methods. A general procedure involves reacting a large molar excess of the appropriate lactone, e.g., epsilon-caprolactone, zeta-enantholactone, and/or eta-caprylolactone with an organic initiator which contains two active hydrogen groups, e.g., hydroxyl, carboxyl, primary amino, secondary amino, and mixtures thereof, such groups being capable of opening the lactone ring whereby it adds as a linear chain (of recurring oxyalkanoyl units) to the site of the active hydrogencontaining group, at an elevated temperature, preferably in the presence of a catalyst, and for a period of time sufficient to produce the desired polymers. By carefully controlling the purity and molar ratio of lactone reactant to organic initiator, there can be produced "initiated" poly(oxyalkanoyl) polymers whose number average molecular weight can range from several hundred to about 100,000. Organic initiators which can be employed include primary diamines, secondary diamines, mixed primary-secondary diamines, aminoalcohols, diols, dicarboxylic acids, hydroxycarboxylic acids, aminocarboxylic acids, etc. Such organic initiators are voluminously illustrated in the literature, e.g., U.S. Pat. Nos. 3,169,945 and 3,427,346. Catalysts which can be employed include, for instance, stannous octanoate, tetrabutyltitanate, dibutyltin dilaurate, and the like. A temperature in the range of from about 150°C to about 250°C for periods ranging upwards to about 24 hours, and longer, are suitable.

Thermoplastic oxycaproyl polymers can also be prepared by reacting the cyclic ester, e.g., epsilon-caprolactone, and/or the corresponding hydroxy-acid, e.g., 6-hydroxycaproic acid, and/or their oligomers, with a mixture comprising diol and dicarboxylic acid, using a molar excess of diol with relation to the dicarboxylic acid, or alternatively, using a molar excess of dicarboxylic acid with relation to the diol. It is highly desirable that free diol or free dicarboxylic acid not be present at the termination of the polyesterification reaction. The water of esterification which results during the reaction can be removed via conventional techniques. The diols and dicarboxylic acids which are particularly suitable include those illustrated by the formulae $HO-R_2O)_{\overline{y}}H$ and $HOOCR_1COOH$ such as ethylene glycol, propylene glycol, diethylene glycol, dipropylene glycol, 1,4-butanediol, 1,5-pentanediol, 1,6-hexanediol, 1,10-decanediol, 1,4-cyclohexanediol, succinic acid, glutaric acid, adipic acid, pimelic acid, suberic acid, azelaic acid, sebacic acid, phthalic acid, and the like.

In the absence of added organic initiator, the thermoplastic oxyalkanoyl polymers can be prepared by polymerizing a lactone reactant, e.g, beta-propiolactone, delta-valerolactone, epsilon-caprolactone, etc., in the presence of anionic catalysts such as di-n-butylzinc, tri-n-butylaluminum, diethylmagnesium, aluminum triisopropoxide, n-butyllithium, dimethylcadmium, and the like. The reaction is desirably conducted at an elevated temperature, e.g., 100°C to 250°C, for periods of time ranging from minutes to several hours, e.g., from about 10 minutes to about 24 hours. The reaction mixture can comprise, in addition to the lactone reactant, minor quantities of other polymerizable cyclic monomers such as tetramethylene carbonate, methyl-epsilon-caprolactone, keto-dioxane, etc. The number average molecular weight of the resulting polymeric products which are produced by this exemplified "non-initiated" method are, in general, quite high. For example, products which have number average molecular weights ranging from about 10,000 to several hundred thousands can be prepared. The patent literature, e.g., U.S. Pat. Nos. 3,021,309 to 3,021,317, discusses in detail the preparation of these polymers.

Thermoplastic oxyalkanoyl polymers can also be prepared by polymerizing an admixture of $C_7-C_9$ lactone, a vicinal epoxy compound, e.g., ethylene oxide, propylene oxide, butylene oxide, cyclohexene oxide, etc., and an interfacial agent such as a solid, relatively high molecular weight poly(vinyl) stearate or lauryl methacrylate/vinyl chloride copolymer (reduced viscosity in cyclohexanone of from about 0.3 to about 1.0), in the presence of an inert normally-liquid saturated aliphatic hydrocarbon vehicle such as heptane, using phosphorus pentafluoride as the catalyst therefor, and in the absence of an active hydrogen-containing organic initiator, at an elevated temperature, e.g., about 80°C, and for a period of time sufficient to produce such polymers.

Thermoplastic oxyalkanoyl polymers can also be prepared by reacting a molar excess of a lactone with a polyoxyalkylene diol which has a molecular weight ranging from about 400 to about 20,000 under conditions discussed supra with reference to the "initiated" poly(oxyalkanoyl) polymers. Illustrative of the polyoxyalkylene diols which are contemplated include the poly(oxyethylene) diols, the poly(oxypropylene) diols, and the poly(oxyethyleneoxypropylene) diols. The resulting polymers can be considered, in effect, to be ABA block polymers in which the A portions represent a polyoxyalkanoyl segment or block and in which the B portion represents a polyoxyalkylene segment or block. The number average molecular weight of these ABA block polymers can range upwards to 50,000, and higher, depending on the molecular weight of the polyoxyalkylene diol reactant and the molar ratio of the lactone reactant to polyoxyalkylene diol reactant employed and consumed in the process. By using mono end-blocked polyalkylene diols such as the monoalkyl ether of polyoxyalkylene diol, the above discussed preparation results in polymers having an AB block configuration.

Oxyalkanoyl polymers which can be considered to be "graft" polymers can be prepared by the addition of $C_6$–$C_9$ lactone at the active hydrogen sites, e.g., hydroxyl or amino, which are pendant along the polymeric chain of so-called vinyl polymers. Such vinyl polymers may, for example, be obtained by the copolymerization of ethylene and vinyl acetate, followed by subsequent saponification of the acetate groups to yield polymers which are characterized by a plurality of pendant hydroxyl groups along the polymeric chain thereof. A wide host of ethylenically unsaturated monomers can be employed to prepare the vinyl polymers and include, for example, 2-hydroxyethyl acrylate, 2-hydroxy methacrylate, styrene, acrylonitrile, propylene, vinyl chloride, and the like. The choice of the ethylenically unsaturated monomers are such that the resulting polymer contains a plurality of pendant hydroxyl groups, or groups which can be converted to hydroxyl groups. The addition of the $C_6$–$C_9$ lactone at the active hydrogen site will produce "graft" polymers of number average molecular weights upwards to approximately 100,000, and higher.

The oxyalkanoyl polymers which have number average molecular weights of, for example, less than 25,000 are characterized by functional end groups. For instance, hydroxyl-terminated polymers can be prepared from a diol initiator and epsilon-caprolactone using molar ratios of lactone to initiator upwards to about 100:1. If desired, these polymers may be reacted with a diisocyanate, e.g., 1,6-hexamethylene diisocyanate, 2,4- and/or 2,6-tolylene diisocyanate, bis(4-isocyanatophenyl)methane, bis(4-isocyanatocyclohexyl)methane, etc., to extend the polymeric chain, or such hydroxyl-terminated polymers as well as their polyurethane extension products can be reacted with so-called "chain stoppers" such as a monocarboxylic acid or anhydride. As indicated previously, the thermoplastic oxyalkanoyl polymers which are suitable in the practice of the invention have, as its lower limit, a reduced viscosity value of at least about 0.1.

Suitable equipment for fluxing a blend comprising thermoplastic oxyalkanoyl polymer and particulate, normally-solid addition polymer include Banbury mixers, screw extruders, two-roll or multiroll mills, ribbon or paddle blendors, calenders, and the like. The time of blending or fluxing is not narrowly critical. The blending time should be sufficient to obtain a substantially uniform dispersion of the particulate polymer in a matrix or continuous phase of the thermoplastic oxyalkanoyl polymer. The temperature is desirably maintained above the melting point of the thermoplastic oxyalkanoyl polymer but below the softening temperature of the particulate polymer in order to preserve the latter in particulate form. Thus, the fluxing and/or fabricating operations can be effected over a fairly wide temperature range. In general, a suitable temperature range is above about the melting point of the thermoplastic oxyalkanoyl polymer, e.g., above about 60°C. for thermoplastic epsilon-caprolactone homopolymer, to below about 120°C. for many of the commercially available particulate addition polymers, e.g., isotactic polypropylene (T softening - 160°C.). A useful and desirable temperature range is one that is at least about 10°C. below the softening temperature of the particulate addition polymer and about 5°C above the melting point of the thermoplastic oxyalkanoyl polymer.

The thermoplastic oxyalkanoyl polymers as exemplified by high molecular weight epsiloncaprolactone homopolymer have the capability of accepting high loadings of the particulate addition polymer. The average particle size of the particulate polymer is not viewed as being narrowly critical. For example, particulate polymers whose average particle size is in the range of from about one micron, and less, to about 1000 microns, and greater, can be utilized in the fabrication of novel articles of manufacture. Such articles exhibit increased modulus and enhanced biodegradability.

The proportions of the thermoplastic oxyalkanoyl polymer and the particulate, normally-solid addition polymer in the blend can vary over a wide range. The optimum composition of the blend will depend, to a significant extent, upon a consideration of several factors such as the end-use contemplated; the characteristics or properties desired in the article of manufacture made from the blend, e.g., mechanical strength properties, rate and degree of biodegradability, etc.; the thermoplastic oxyalkanoyl polymer of choice; the particulate addition polymer of choice; the presence and kind of other ingredients, e.g., filler, plasticizers, dyes, etc.; and the like.

In general, novel articles of manufacture can be formed from blends which comprise from about 20 to about 95 weight percent of thermoplastic oxyalkanoyl polymer and from about 80 to about 5 weight percent of particulate addition polymer, based on the total weight of the blend. In various desirable embodiments which take into consideration various factors as illustrated above, useful blends comprise from about 25 to 90 weight percent of thermoplastic oxyalkanoyl polymer, and from about 75 to about 10 weight percent of particulate addition polymer, based on the total weight of the blend.

In various aspects of the invention the blends are useful in the preparation of novel biodegradable articles of manufacture such as mulch film, disposable containers, shipping containers, storage containers, packaging material, transplanter containers, and the like. Well-known techniques in the art can be used to fabricate these novel articles and they include, for instance, compression molding, injection molding, transfer molding, extrusion, vacuum forming, blow molding, calendering, rotational molding, and the like.

Novel articles of manufacture which have "tailor-made" or "built-in" properties or characteristics can also be fabricated from the novel blends. By way of illustrations, novel articles of manufacture having utility in horticultural, silvicultural, and agricultural applications, e.g., mulch film and transplanter containers, can be fabricated from blends comprising biodegradable thermoplastic oxyalkanoyl polymer, normally-solid, particulate addition polymer, and water-soluble polymers, e.g., wax-like and solid water-soluble ethylene oxide homopolymers and copolymers. Such novel articles have the ability to undergo relatively slow dissolution or leaching in an aqueous or humid surrounding to thus provide a more favorable environment for growth of fungi. Additional ingredients which can be included in the blends include plant nutrients, fertilizer, insecticides, pesticides, herbicides, plasticizers, fibrous and non-fibrous fillers, e.g., talc, limestone, bentonite, kaolin, vermiculite, asbestos, mica, etc.; naturally occurring biodegradable products, e.g., sawdust, shredded tree bark, peat moss, cotton seed hulls, etc.; and the like. Such additional ingredients can comprise upwards to about 50 weight percent of the total blend.

In the practice of various embodiments of the invention it is desirable that the novel articles of manufacture possess properties and characteristics which are suitable for the application contemplated. For instance, if the novel articles are transplanter containers to be used in mechanical transplantation methods, it is desirable that such articles have sufficient strength properties to withstand breakdown or failure during use. By way of illustration, one can use, if desired, containers which are characterized by a modulus range of from about 10,000 psi, and lower, to about 1,000,000 psi (as determined by ASTM Method D-638). On the other hand, containers characterized by a much lower modulus can be tolerated in hand planting techniques, e.g., at least about 300 psi. It is to be understood that the aforementioned values are merely illustrative and that higher and lower values are contemplated as being within the scope of the invention.

One aspect of the invention is directed to novel transplanter containers, fabricated from a blend comprising particulate addition polymer in a matrix of biodegradable thermoplastic oxyalkanoyl polymer, and optionally, a germination medium in said containers with-/without a seed or seedling in such medium. The container can be of any size and shape capable of having utility in horticultural, silvicultural, and agricultural applications. It can be in the form of a flower pot, cone, bullet, tube, cylinder, tray, etc. It should be capable of holding the germination medium therein. In this connection additional support or reinforcement material can be used. For instance, a container shaped in the form of a hollowed tube, opened at both extremities, may not be suitable in holding the germination medium in its interior. This drawback can be overcomed by stoppering one end of such tube with suitable plugging means, if necessary. The germination medium can be any mixture suitable for growing plant life such as farm products, flowers, shrubs, trees, grass, etc. The germination medium can be formed from synthetic materials, substances found in nature, or mixtures of both. A desirable germination medium comprises soil formed from disintegrated and decomposed rocks and minerals generally mixed with organic matter in various stages of decay, and having substantial porosity or pore space. The pore space will vary with the texture of the soil. The soil may comprise silt, sand, clay, stone, gravel, minerals, organic matter, etc. Conditioners and stabilizers can be added to or contained in soil and they include, for example, gypsum, calcium chloride, limestone, vermiculite, iron sulfate, water-soluble high molecular weight polymeric electrolytes, and others. Nutrients can be added to the soil to aid plant growth and to supplement the plant-food content thereof. The more important ones include the compounds of nitrogen, phosphorous, and potassium. Trace elements such as magnesium, iron, zinc, copper, etc., have been shown to be beneficial to plant growth and can be added to the soil. Various types of fertilizers provide useful nutrients. They can range from inorganic compounds as illustrated by ammonium nitrate types to organic compounds such as the long lasting ureaforms which release the nitrogen slowly.

Any type of seed or seedling capable of growing in soil is contemplated. Of special interest are tree seeds and seedlings as illustrated by the deciduous and coniferous types such as oak, ash, maple, elm, Douglas Fir, pine, spruce, cedar, etc., shrub seedlings as illustrated by ornamental or evergreen types such as taxus, holly, juniper, etc.; plants and flowers of the various well-known varieties; and the like.

By the terms "biodegradable" and "biodegradability", as used herein, are meant that the blends and articles therefrom are capable of being consumed by microorganisms as, for example, bacteria or fungi, in an environment suitable to the growth of microorganisms such that there results a weight loss of at least approximately 20 weight percent in the biodegradable thermoplastic oxyalkanoyl polymer component within a period of about four years, and generally within about two years. The degree and rate of biodegradability depend, to an extent, on the weight percent oxyalkanoyl content, especially oxycaproyl content, in the thermoplastic oxyalkanoyl polymer used in the blend or article, the kind and concentration of the particulate addition polymer employed, the presence or absence of other components, e.g., plasticizer, naturally occurring biodegradable product, dyes, etc.

In the illustrative Examples hereinafter disclosed, numerical references in the copolymer designate parts by weight. For example, 67 ethylene/33 vinyl acetate refers to a copolymer containing 67 parts by weight of ethylene and 33 parts by weight of vinyl acetate chemically combined therein.

EXAMPLES 1–24

In Examples 1–24 infra, samples of commercially available high molecular weight polymers were pressed or molded into plaques from which test specimens were cut. These specimens were tested for degradation by fungi using ASTM - D-1924-63$^{(1)}$. This procedure requires the placement of test specimens in or on a solid agar growth medium that is deficient only in carbon. The medium and specimens are inoculated with the test microorganisms and incubated for three weeks. Any growth which may occur is dependent on the utilization of a component of the specimen as a carbon source by the test organism. The test fungi consisted of a mixture of *Aspergillus niger*, *Aspergillus flavus*, *Chaetomium globosum*, and *Penicillium funiculosum*. Since possible complications that growth may occur as a result of the presence of additives in the polymeric specimen, it was necessary that the polymeric specimen tested be free from stabilizers, plasticizers, lubricants, and other extraneous organic substances, or that the presence of such additives be recognized. If a pure polymeric specimen showed heavy growth and concurrent loss of weight and mechanical properties this was considered good evidence of its biodegradability.

(1) ASTM-D-1924 Recommended practice for determining resistance of synthetic polymeric materials to fungi Ann Book of ASTM Standards 1970, Part 24, page 593.

After various exposure times up to 3 weeks, and longer, the samples were examined and assigned growth ratings as shown below:

Growth Ratings:
0 = No Growth
1 = Traces (Less than 10% Covered)
2 = Light Growth (10 to 30% Covered)
3 = Medium Growth (30 to 60% Covered)
4 = Heavy Growth (60 to 100% Covered)

The pertinent data are set out in Table I below.

TABLE I

| Sample No. | Commercial Thermoplastic | Growth Rating |
|---|---|---|
| 1 | Acrylonitrile/Butadiene/Styrene Terpolymer (ABS)[a] | 0 |
| 2 | Blend of ABS and Poly(Bisphenol A Carbonate)[b] | 0 |
| 3 | Butadiene/Acrylonitrile Rubber[c] | 0 |
| 4 | 72/Styrene/28 Acrylonitrile Copolymer | 0 |
| 5 | Poly(Methyl Methacrylate)[d] | 0 |
| 6 | Poly(Ethylene Terephthalate)[e] | 0 |
| 7 | Poly(Cyclohexanedimethanol Terephthalate)[f] | 0 |
| 8 | Poly(Bisphenol A Carbonate)[g] | 0 |
| 9 | Poly(4-Methyl-1-Pentene) | 0 |
| 10 | Polyisobutlene[h] | 0 |
| 11 | Chlorosulfonated Polyethylene[i] | 0 |
| 12 | Cellulose Acetate[j] | 0 |
| 13 | Cellulose Butyrate[k] | 0 |
| 14 | Nylon 6, Nylon-6/6;Nylon-12 | 0 |
| 15 | Poly(Vinyl Butyral) | 0 |
| 16 | Polyformaldehyde[l] | 0 |
| 17 | Poly(Vinyl Ethyl Ether); $I_r$=4 | 0 |
| 18 | Poly(Vinyl Acetate); $I_r$=0.8 | 1 |
| 19 | Poly(Vinyl Acetate), 50% Hydrolyzed to Poly(Vinyl Alcohol) | 1 |
| 20 | High Density Polyethylene, 31,600 M.W. | 0 |
| 21 | High Density Polyethylene 52,500 M.W. | 0 |
| 22 | High Density Polyethylene 97,300 M.W. | 1 |
| 23 | Low Density Polyethylene, 21,000 M.W. | 1 |
| 24 | Low Density Polyethylene 28,000 M.W. | 0 |

[a]Kralastic K2938 by Uniroyal, Inc.
[b]Cycoloy by Borg Warner Corp.
[c]Hycar 1002 by B. F. Goodrich Co.
[d]Lucite by E. I. duPont de Nemours & Co.
[e]Arnite by Polychem AKU-GE Holland
[f]Kodel by Eastman Kodak Co.
[g]Lexan 101 by General Electric Co.
[h]Vistanex by I.G. Farben
[i]Hypalen (29% Cl) by E. I. duPont de Nemours & Co.
[j]Tenite (036A3Z19748) by Eastman Kodak Co.
[k]Tenite (233A22300H2) by Eastman Kodak Co.
[l]Celcon by Celanese Corp.

EXAMPLES 25-30

Various polymers were tested for biodegradability in the manner indicated in Examples 1-24 supra. The results are documented in Table II below.

TABLE II

| Sample No. | Polymer | Reduced Viscosity | Growth Rating |
|---|---|---|---|
| 25 | Epsilon-Caprolactone Homopolymer | 0.7 | 4 |
| 26 | Epsilon-Caprolactone Homopolymer | 0.3 | 4 |
| 27 | Pivalolactone Homopolymer | 0.1 | 0 |
| 28 | Poly(Ethylene Terephthalate) | high | 0 |
| 29 | Poly(Cyclohexanedimethanol Terephthalate) | high | 0 |
| 30 | Thermoplastic Polyoxycaproyl Polyurethane[a] | high | 4 |

[a]Reaction of diethylene glycol initiated poly(epsilon-caprolactone) diol of 2000 moleculalr weight with bis(4-isocyanatophenyl)methane using an NCO/OH ratio equal to one.

EXAMPLES 31-32

Poly(beta-propiolactone) and poly(deltavalerolactone) were tested for biodegradability in the manner indicated in Examples 1-24 supra. The results are noted in Table III below.

TABLE III

| Sample No. | Polymer | Reduced Viscosity | Growth Rating[a] |
|---|---|---|---|
| 31 | Beta-Propiolactone Homopolymer | 1.36[b] | 4 |
| 32 | Delta-Valerolactone Homopolymer | 0.48 | 4 |

[a]Determined in accordance with ASTM Method D-1924-63.
[b]Determined 0.2 gram/100cc chloroform.

EXAMPLES 33-41

A. In Examples 34-37 various blends of particulate polymers, i.e., low density polyethylene or isotactic polypropylene (average particle size less than 500 microns), dispersed in epsilon-caprolactone homopolymer designated as PCL for convenience, reduced viscosity ($I_r$) of 0.7, were formed by fluxing on a two-roll mill for periods of time ranging from about 10-15 minutes at temperatures of about 80°C. to 85°C. Plaques measuring about 6 × 6 × 0.04 inches from the blend were then formed via compression molding techniques. Strips measuring approximately 1 × 2 × 0.04 inches were cut from the plaques. Various strips were buried in a mixture of equal parts of New Jersey garden soil, Michigan peat moss, and builders sand. After two months the strips were removed and measured for weight loss. Various strips were also tested for degradation by fungi using ASTM Method D-1924-63. The pertinent data are noted in Table IV below.

B. In Examples 38-41, PCL and polyethylene or polypropylene were melted together to form a uniform blend. Plaques were then formed and strips were cut from such plaques and subjected to the soil burial tests all in the same manner as set out in section (A) above. The pertinent data are noted in Table IV below.

TABLE IV

| Example No. | Composition of Blend[a] | Growth Rating[b] | Modulus × 10³ psi[c] | Izod Impact[d] | Wt. Loss, 2 Months |
|---|---|---|---|---|---|
| 33 | 100 PCL | 4 | 68 | 0.83 | 8 |
| 34 | 80 PCL/20 Particulate LDPE[e] | 3 | 53 | 0.64 | 16.4 |
| 35 | 60 PCL/40 Particulate LDPE | 4 | 45 | 0.90 | 16.1 |
| 36 | 80 PCL/20 Particulate PP[f] | 3 | 71 | 0.75 | 10.9 |
| 37 | 60 PCL/40 Particulate PP | 3 | 59 | 0.49 | 9.1 |
| 38 | 80 PCL/20 HDPE[g] | 4 | 77 | 0.41 | 6.5 |
| 39 | 80 PCL/20 LDPE | 4 | 58 | (h) | 8.9 |
| 40 | 80 PCL/20 PP | 3 | 91 | 0.46 | 8.1 |
| 41 | 60 PCL/40 HDPE | 3 | 96 | 0.37 | 4.2 |

[a]Examples 34–37 blends are particulate polymer dispersed in PCL. Examples 38–41, a melt of the two polymers forms the blend.
[b]Determined in accordance with ASTM Method D-1924-63.
[c]Determined in acordance with ASTM Method D-638.
[d]Determined in accordance with ASTM Method D-256.
[e]LDPE represents low density polyethylene.
[f]PP represents isotactic polypropylene.
[g]HDPE represents high density polyethylene.
[h]Not measured.

EXAMPLE 42

Blends of particulate low density polyethylene dispersed in a matrix of thermoplastic beta-propiolactone homopolymer ($I_r$ of 1.36; 0.2 gm/100cc. of chloroform) and thermoplastic deltavalerolactone homopolymer ($I_r$ of 0.48) are tested for biodegradability (ASTM Method D-1924-63). Each blend contains 25 parts of the particulate polymer and 75 parts of the thermoplastic polymer. Blends are also injection molded into containers designed in the shape of a "bullet" measuring approximately 5 inches in length and one inch in outside diameter at the top. The wall of the bullet is about 1/16 inch in thickness and is weakened by a slit 1/16 inch wide that extends longitudinally from the rim to a hole near the point of the bullet. The hole is about ½ inch long. The containers are filled with a mixture containing equal parts of garden soil, Michigan peat moss, and builders sand, and seeded with Douglas Fir. Within the confines of a greenhouse, the containers are then inserted into garden soil enriched with plant nutrients and conditioners. The watering schedule is predetermined and takes into consideration the bullet size, climate and tree species. After periods of 6 months and 12 months, normal root structure and normal growth of the tree seedlings are observed. Visual examination of the bullets show substantial disintegration.

What is claimed is:

1. Biodegradable shaped articles comprising a shaped composition of normally solid addition polymer dispersed in particulate form in a matrix of biodegradable thermoplastic oxyalkanoyl polymer, said addition polymer having been so dispersed in said oxyalkanoyl polymer at a temperature below the softening temperature of said addition polymer, said composition comprising from about 20 to about 95 weight percent of said biodegradable thermoplastic oxyalkanoyl polymer and from about 80 to about 5 weight percent of said particulate, normally-solid addition polymer, based on the total weight of said composition, said particulate, normally-solid addition polymer possessing a softening temperature at least about 15°C. higher than the melting point of said biodegradable thermoplastic oxyalkanoyl polymer, and said biodegradable thermoplastic oxyalkanoyl polymer being characterized by a reduced viscosity value of at least about 0.1 and upwards to about 12 and being further characterized in that at least about 10 weight percent of said thermoplastic oxyalkanoyl polymer is attributable to recurring oxyalkanoyl units of the formula

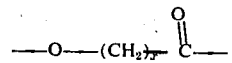

wherein $x$ is an integer having a value of 2 to 7, with the proviso that $x$ does not equal 3.

2. The biodegradable shaped articles of claim 1 wherein said particulate, normally-solid addition polymer is a polymer of monomers selected from the group consisting of alkenes, alkyl 2-alkenoates, and mixtures thereof.

3. The biodegradable shaped articles of claim 2 wherein said recurring oxyalkanoyl units have the formula

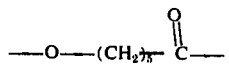

4. The biodegradable shaped articles of claim 1 wherein said biodegradable thermoplastic oxyalkanoyl polymer has a reduced viscosity value of at least about 0.2 to about 8 and is further characterized in that at least about 20 weight percent of said polymer is attributable to the recurring oxyalkanoyl unit shown therein.

5. The biodegradable shaped articles of claim 4 wherein at least about 50 weight percent of said polymer is attributable to recurring oxycaproyl units.

6. The biodegradable shaped articles of claim 5 wherein at least about 60 weight percent to about 100 weight percent of said polymer is attributable to recurring oxycaproyl units.

7. The biodegradable shaped articles of claim 6 wherein at least about 80 to about 100 weight percent of said polymer is attributable to recurring oxycaproyl units.

8. The biodegradable shaped articles of claim 6 wherein said polymer has a reduced viscosity value of at least about 0.25 to about 3.

9. The biodegradable shaped articles of claim 7 wherein said composition comprises from about 25 to about 90 weight percent of said biodegradable thermoplastic oxyalkanoyl polymer and from about 75 to about 10 weight percent of said particulate, normally-solid addition polymer, based on the total weight of said composition.

10. the biodegradable shaped articles of claim 9 wherein said particulate, normally-solid addition polymer is a polyalkene.

11. The biodegradable shaped articles of claim 10 wherein said polyalkene is polyethylene.

12. The biodegradable shaped articles of claim 10 wherein said polyalkene is polypropylene.

13. The biodegradable shaped articles of claim 10 wherein said polyalkene is polystyrene.

14. The biodegradable shaped articles of claim 9 in the form of a film.

15. The biodegradable shaped articles of claim 9 in the form of a container.

16. A process for fabricating biodegradable shaped articles which comprises:
 i. heating a mixture comprising particulate, normally-solid addition polymer and biodegradable thermoplastic oxyalkanoyl polymer,
   said addition polymer being adapted to being dispersed in said oxyalkanoyl polymer in particulate form;
 ii. said mixture comprising from about 20 to about 95 weight percent of said biodegradable thermoplastic oxyalkanoyl polymer and from about 80 to about 5 weight percent of said particulate, normally-solid addition polymer, based on the total weight of said mixture;
 iii. said particulate, normally-solid addition polymer possessing a softening temperature at least about 15°C. higher than the melting point of said biodegradable thermoplastic oxyalkanoyl polymer;
 iv. said biodegradable thermoplastic oxyalkanoyl polymer being characterized by a reduced viscosity value of at least about 0.1 and upwards to about 12 and being further characterized in that at least about 10 weight percent of said thermoplastic oxyalkanoyl polymer is attributable to recurring oxyalkanoyl units of the formula

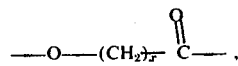

wherein $x$ is an integer having a value of 2 to 7, with the proviso that $x$ does not equal 3;
 v. said heating step being effected at a temperature above the melting point of said biodegradable thermoplastic oxyalkanoyl polymer but below the softening temperature of said particulate, normally-solid addition polymer;
 vi. mixing said mixture during said heating step thereby dispersing said particulate, normally-solid addition polymer in a matrix of said biodegradable thermoplastic oxyalkanoyl polymer; and
 vii. thereafter fabricating the resulting mixture into shaped articles at a temperature below the softening temperature of said particulate, normally-solid addition polymer and so as to maintain said particulate, normally-solid addition polymer in a dispersed state in a matrix of said biodegradable thermoplastic oxyalkanoyl polymer.

17. The process of claim 16 wherein said heating step is effected at a temperature about 5°C. above the melting point of said biodegradable thermoplastic oxyalkanoyl polymer but about 10°C. below the softening temperature of said particulate, normally-solid addition polymer.

18. The process of claim 17 wherein said biodegradable thermoplastic oxyalkanoyl polymer has a reduced viscosity value of at least about 0.2 to about 8 and is further characterized in that at least about 20 weight percent of said polymer is attributable to recurring oxycaproyl units.

19. The process of claim 18 wherein at least about 50 weight percent of said biodegradable thermoplastic oxyalkanoyl polymer is attributable to recurring oxycaproyl units.

* * * * *